United States Patent
Pihl et al.

(10) Patent No.: US 6,947,757 B2
(45) Date of Patent: Sep. 20, 2005

(54) METHOD FOR COMMUNICATING INFORMATION

(75) Inventors: Kari Pihl, Kaarina (FI); Hannu Pirilä, Littoinen (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/525,884

(22) Filed: Mar. 15, 2000

(65) Prior Publication Data

US 2003/0186707 A1 Oct. 2, 2003

(30) Foreign Application Priority Data

Mar. 16, 1999 (FI) .................................................. 990591

(51) Int. Cl.⁷ .............................................. H04Q 7/20
(52) U.S. Cl. .................. 455/466; 455/456; 370/389; 370/392
(58) Field of Search ............................... 455/456, 466; 370/389, 392; 342/357; 701/215

(56) References Cited

U.S. PATENT DOCUMENTS

| | | | | |
|---|---|---|---|---|
| 5,563,880 A | * | 10/1996 | Sabourin et al. ............. 342/352 |
| 5,878,033 A | | 3/1999 | Mouly ......................... 370/312 |
| 5,920,822 A | * | 7/1999 | Houde et al. ............... 340/7.27 |
| 6,002,455 A | * | 12/1999 | Enomoto et al. ......... 348/425.3 |
| 6,052,597 A | * | 4/2000 | Ekstrom ...................... 342/367 |
| 6,091,961 A | * | 7/2000 | Khalil .......................... 455/466 |
| 6,097,949 A | * | 8/2000 | Jung et al. ................... 455/426 |
| 6,108,555 A | * | 8/2000 | Maloney et al. .......... 455/456.2 |
| 6,212,176 B1 | * | 4/2001 | Andersson et al. .......... 370/347 |
| 6,229,809 B1 | * | 5/2001 | Murphy et al. .............. 370/401 |
| 6,256,489 B1 | * | 7/2001 | Lichter et al. ............ 455/404.2 |
| 6,259,923 B1 | * | 7/2001 | Lim et al. .................... 455/456 |
| 6,295,455 B1 | * | 9/2001 | Fischer et al. .............. 342/450 |
| 6,356,759 B1 | * | 3/2002 | Mustajarvi ................... 379/346 |
| 6,490,454 B1 | * | 12/2002 | Kangas et al. ........... 455/456.1 |

FOREIGN PATENT DOCUMENTS

| | | |
|---|---|---|
| EP | 0398773 B1 | 11/1990 |
| FI | 101445 B | 6/1998 |
| WO | WO 92/05672 | 4/1992 |
| WO | WO 97/385548 | 10/1997 |

* cited by examiner

*Primary Examiner*—Stephen D'Agosta
(74) *Attorney, Agent, or Firm*—Perman & Green, LLP

(57) ABSTRACT

The invention relates to communication of information in fixed-length messages in mobile communication systems, particularly in association with positioning methods. In a method according to the invention information is transferred in a fixed-length message such that the payload portion of the message includes content information to define the contents of the payload portion of the message, and in accordance with the content information the payload portion of the message includes information elements defined by the content information.

32 Claims, 1 Drawing Sheet

METHOD FOR COMMUNICATING INFORMATION

TECHNICAL FIELD OF THE INVENTION

The invention relates to the communication of information in mobile communication systems using fixed-length messages, particularly in association with positioning methods. In particular the invention relates to a method according to the preamble of claim 1.

BACKGROUND OF THE INVENTION

Positioning information of a mobile station may be used for many purposes:
- pricing of calls may be based on the position of a mobile station, whereby calls made from the home area, for example, may be cheaper;
- when an emergency call is placed from a mobile station, it is possible to determine the position of the mobile station (this feature will be required by the authorities in some countries);
- the user of a mobile station may need information about his/her location e.g. when traveling,
- the authorities can use the positioning information to locate a stolen mobile station or to trace a missing person, for example.

As position determination involves data communication in the system, it is necessary that the operator be able to charge for the location service according to use. In addition, positioning has to be reliable so that the location information cannot be falsified by the user e.g. in order to be allowed a home area discount while elsewhere than in the home area. Furthermore, the data may be confidential as it is not necessarily in the interests of the operator to reveal system-related information to a third party.

The Global Positioning System (GPS) based on the utilization of signals received from satellites is widely used for positioning purposes. This solution would require that a GPS receiver be added to mobile stations, which would result in considerable additional costs. Therefore, to locate a mobile station in a positioning system intended for all mobile phones it is preferable to utilize the cellular system's own signals transferred between the mobile station and base stations, even though some mobile station models may also include a GPS receiver.

A method is known from publication [1] WO 92/05672 wherein the distance of a mobile station from a base station is determined on the basis of the propagation delay of a signal transferred between the mobile station and the base station. By measuring at the base station the propagation delay of the signal sent by the mobile station, it is obtained a distance estimate for the range between the mobile station and the base station. Because of a certain measuring accuracy associated with the distance measurement, the estimated location of the mobile station is a ring-shaped area the width of which depends on the accuracy of the time delay measurement. A corresponding propagation delay measurement may also be performed for a signal between the mobile station and other base stations. The result is then one ring-shaped location area per each base station involved in the measurement. Thus, the mobile station can be located at the intersection of the location areas, the dimensions of the intersection corresponding to the measuring accuracy. In the method described above, position determination is substantially carried out by the system, and no special functions are needed in mobile stations to realize the measurement.

A disadvantage of the method based on the propagation delay measured from a signal between a mobile station and base stations is that the propagation delay cannot be easily measured with such an accuracy that the accuracy of the mobile station location information would be adequate for all the above-mentioned applications. In addition, the mobile station has to establish an uplink connection with every base station for which the propagation delay is to be measured. If the positioning information has to be continuously updated, the data traffic associated with the positioning puts a considerable load on the connection capacity of the mobile communication system. Furthermore, the high volume of data traffic makes the measurement slow. Another problem with the method is that errors in the absolute timing accuracy of the mobile station result in errors in the positioning result obtained.

It is also known a measurement based on the time difference of received signals, wherein the measurement can be performed by the mobile station or by the system. Let a mobile station receive signals from a plurality of base stations. An estimate for the position of the mobile station is determined by means of the observed time difference (OTD) between the signals received from the base stations, whereby it is possible to calculate by means of the time difference between signals received from two base stations the difference d1–d2 between the distance d1 between the mobile station and a first base station and the distance d2 between the mobile station and a second base station. Then those potential location points of the mobile station in which the value of the distance difference equals d1–d2 constitute a hyperbola-shaped curve, which thus represents the potential location points of the mobile station. Since the measurement result involves a certain error margin, the location area of the mobile station is in reality a band between two hyperbolas, the width of the band depending on the error margin of the measurement result. When signals are received from at least three base stations, the result consists of a plurality of location areas and the mobile station is located at the intersection of those areas. Determining a restricted location area requires time difference measurement for signals received from at least three base stations unless other methods such as propagation delay measurement are used in addition to the time difference measurement. If other additional methods are used, it is possible to use the time difference measured for signals received from only two base stations. Such determination of location of a mobile station can be realized either by the mobile station or by the system.

From patent document [2] FI 101445 it is known a solution in which a mobile station measures the time differences of signals received from base stations and sends the measured time difference data to the mobile communication system. A mobile location center in the mobile communication system uses the measured time difference data, base station position coordinates and base station relative time difference (RTD) data to calculate the location of the mobile station.

In the solutions disclosed in documents [1] and [2], the location of a mobile station is calculated by the cellular network. A solution is known from document [3] EP 398773 wherein a mobile station receives from a mobile communication system information about the relative time differences and position coordinates of base stations situated in the area around the mobile station. The mobile station then measures the time differences of the signals received from said base stations and determines the position of the mobile station on the basis of the measured time differences and the base stations' relative time differences and position coordinates, using a position determination algorithm stored in the mobile station.

So, the time difference between signals received by a mobile station from two base stations is called an observed time difference (OTD). Observed time difference measurement is used for synchronizing the mobile station with the clock of the new serving base station in connection with a hand-off, so the OTD measuring method is known in the prior art. The OTD is measured in two steps because a mobile station cannot receive signals from two base stations simultaneously. First the mobile station measures a first time difference between the mobile station's own clock and the clock of the signal received from a first base station. Then the mobile station measures a second time difference between the mobile station and a second base station. The observed time difference OTD is obtained by calculating the difference of the first and second time differences.

In mobile communication systems, such as e.g. GSM and UMTS, the lengths of the control messages sent to mobile stations are fixed and the channels through which control messages are sent have limited capacities. When implementing new services, such as e.g. the positioning services described above, there often emerges a need to convey more information than what can be included in the message reserved for that particular purpose. For example, the SMS-CB (Short Message Service Cell Broadcast) message may be used to convey positioning data, but this message is rather short, only 88 octets of which an 82-octet payload portion may be used to transfer positioning data. As was mentioned above, the positioning methods involve a lot of communication between a mobile station and the network. For example, base station location data are typically indicated using WGS-84 coordinates, so one message cannot include location data for very many base stations. One solution would be to send more messages and thereby convey more information, but this would spend the limited resources of the control channel in question. The transmission interval of SMS-CB messages, for example, is two seconds, so the limited communication capacity results in considerable delays if more than one message is needed to convey one data set. Thus it is needed a better solution for this problem.

SUMMARY OF THE INVENTION

An object of the invention is to provide a message transfer method enabling the transfer of maximum amount of information in one fixed-length message. Another object of the invention is to realize a transfer method for positioning data using fixed-length broadcast messages and enabling a flexible and optimizable transfer of positioning data.

The objects of the invention are achieved by realizing a method for transferring data in a fixed-length message, which method comprises steps of including in the payload portion of the message content information to define the contents of the payload portion of the message, and including in the payload portion of the message, in accordance with the description of the content information, information elements defined by the content information.

The method according to the invention is characterized by what is expressed in the characterizing part of the independent claim directed to the method. The sub-claims describe other advantageous embodiments of the invention.

BRIEF DESCRIPTION OF THE DRAWING

The invention is below described in greater detail, referring to the preferred embodiments presented by way of example and to FIG. 1 which illustrates the structure of the payload portion of a message according to a preferred embodiment of the invention, and to FIG. 2 which illustrates a method according to an advantageous embodiment of the invention.

DETAILED DESCRIPTION OF THE PREFERRED EMBODIMENTS OF THE INVENTION

A fixed-length message to be sent in accordance with the invention is realized such that a required number of information elements (IE) can be included in it according to need, whereby, in order to include the necessary information elements in said fixed-length message, the number of bits used to represent the information elements in question depends on the quantity and length of the information elements to be included in the message. Such information elements that can be represented by a varying number of bits are here called variable-length information elements. The number of bits used to represent variable-length information elements can be reduced by compromising over the accuracy of the value represented by them. The message also includes information about what information elements are included in the message as well as the number of bits used to represent each variable-length information element. This "header information" is below called content information. Advantageously the content information may also include information about the resolution used to represent each variable-length information element. This can be accomplished by indicating the information element value step that corresponds to one bit or by indicating the information element value range that corresponds to the binary value range used. Advantageously the message may also include fixed-length information elements in addition to the variable-length information elements. The content information may be included in the payload portion of the message, which contains the information element data, or in the header portion of the message. In this application, the term information element refers to an individual piece of information, such as a parameter value or the like.

The solution according to the invention finds particular utility in communicating information necessary for positioning mobile stations as in the positioning methods described above the mobile station needs a relatively large amount of data about base stations. Using the solution according to the invention it is possible to communicate a large amount of positioning data in a single SMS-CB (Short Message Service Cell Broadcast) message.

Figure 1:
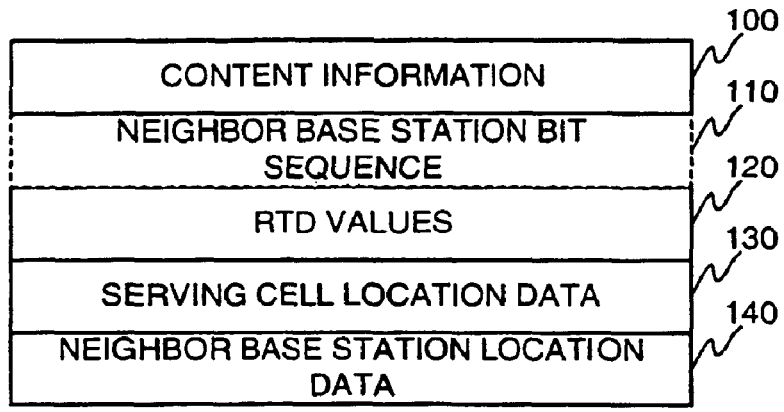

Below it will be described an exemplary embodiment of the invention in which positioning data are communicated to mobile stations in an SMS-CB message for the purpose of mobile station positioning. The size of the SMS-CB message is 88 octets of which 82 octets can be used for the payload of the message. FIG. 1 shows the structure of the SMS-CB message payload according to this exemplary embodiment. The payload portion first has a segment 100 indicating the content information, followed by the information elements proper 110, 120, 130, 140. In this embodiment the content information 100 of the message is indicated by means of the first 9 bits of the payload as follows:

| Bit | Definition |
|---|---|
| 1, 2 and 3 | defines neighbor base stations indicated |
| 4, 5 and 6 | accuracy of data relating to neighbor base stations |
| 7 and 8 | accuracy of RTD values |
| 9 | RTD value range |

Let us next look more closely at the definitions of these bits in this exemplary embodiment. The neighbor base stations the data of which are included in the message are indicated using the first three bits as follows:

| bit 1 | bit 2 | bit 3 | definition |
|---|---|---|---|
| 0 | 0 | 0 | the neighbor base station data include the data of all neighbor base stations in the neighbor base station list |
| 0 | 0 | 1 | the neighbor base station data include the data of every second neighbor base station in the neighbor base station list, namely of those the running number of which in the list is even |
| 0 | 1 | 0 | the neighbor base station data include the data of every second neighbor base station in the neighbor base station list, namely of those the running number of which in the list is odd |
| 0 | 1 | 1 | the neighbor base station data include the data of every third neighbor base station in the neighbor base station list, starting from the first base station in the list |
| 1 | 0 | 0 | the neighbor base station data include the data of every third neighbor base station in the neighbor base station list, starting from the second base station in the list |
| 1 | 0 | 1 | the neighbor base station data include the data of every third neighbor base station in the neighbor base station list, starting from the third base station in the list |
| 1 | 1 | 0 | the neighbor base station data comprise a bit sequence that indicates the base stations the data of which are included in the message |
| 1 | 1 | 1 | reserved for later use |

In the table above, bit pattern '110' indicates that the neighbor base stations are indicated using a bit sequence. In this case the bit sequence is located at the beginning of the portion containing the neighbor base station data in the message. The bit sequence comprises as many bits as in the neighbor base station list delivered to mobile stations, and each bit represents a base station located at the corresponding location in the neighbor base station list. If a bit in the bit sequence is 0, the message does not include the data of that particular base station, and if a bit in the bit sequence is 1, the message includes the data of that particular base station.

Bits 4, 5 and 6 in the content information indicate by means of a position data value range the accuracy of the neighbor base station position data as follows:

| bit 4 | bit 5 | bit 6 | value range |
|---|---|---|---|
| 0 | 0 | 0 | 5 km |
| 0 | 0 | 1 | 10 km |
| 0 | 1 | 0 | 15 km |
| 0 | 1 | 1 | 20 km |
| 1 | 0 | 0 | 25 km |
| 1 | 0 | 1 | 30 km |
| 1 | 1 | 0 | 35 km |
| 1 | 1 | 1 | 40 km |

The value range together with the number of bits used to indicate the position information indicates the resolution of the position data. For example, if the bit pattern of bits 4, 5 and 6 is '011' and position information is indicated using 15 bits, the step of the value of the position information is 20 km/$2^{15}$ meters, or 0.6 meters, approximately.

Bits 7 and 8 indicate the accuracy of the RTD values as follows:

| bit 7 | bit 8 | accuracy of RTD values |
|---|---|---|
| 0 | 0 | 1/16 bit |
| 0 | 1 | 1/32 bit |
| 1 | 0 | 1/64 bit |
| 1 | 1 | 1/128 bit |

Bit 9 indicates the RTD value range. If bit 9 is 0, the RTD value range is a time period that corresponds to one time slot, and if bit 9 is 1, the RTD value range is a time period that corresponds to 8 time slots. Bits 7, 8 and 9 also indicate the number of bits used to represent a single RTD value. For example, if RTD values cover a range of 1 time slot, it takes 12 bits to represent RTD values with the accuracy of 1/16 bit. So, the representation of one RTD value requires and the message in question uses a number of bits according to the table below:

| time slots | accuracy | bits needed to represent RTD value |
|---|---|---|
| 1 | 1/16 bit | 12 |
| 1 | 1/32 bit | 13 |
| 1 | 1/64 bit | 14 |
| 1 | 1/128 bit | 15 |
| 8 | 1/16 bit | 15 |
| 8 | 1/32 bit | 16 |
| 8 | 1/64 bit | 17 |
| 8 | 1/128 bit | 18 |

If the bit pattern of bits 1, 2 and 3 in the content information is '110', the payload portion comprises a bit sequence 110 defining in the manner described above the base stations the position data of which are given in this message. The next segment 120 indicates the neighbor base station RTD values included in this message using a number of bits indicated by bits 7, 8 and 9 in the content information 100. The payload portion of the message next comprises the serving base station location information 130 in accordance with the value range indicated by bits 4, 5 and 6 in the content information 100. At the end of the payload portion it is indicated the location information 140 of the neighbor base stations included in this message in accordance with the value range indicated by bits 4, 5 and 6 in the content information 100.

The base station location information 130, 140 may advantageously be indicated in such a manner that the location of the serving base station is given in absolute coordinates according to a predetermined coordinate system, such as the WGS-84, and the neighbor base station location data are indicated relative to the serving base station. In other words, the locations of the neighbor base stations are in this case indicated as longitude and latitude based distances from the serving base station. Thus the locations of the neighbor base stations can be indicated very accurately with a small number of bits. Moreover, in a preferred embodiment of the invention the number of bits used to indicate the location of a given neighbor base station can be included in the content information 100. In another preferred embodiment of the invention the space left by the other information elements in the payload is used to indicate the neighbor base station locations, so that the number of bits left for indicating one coordinate of one neighbor base station can be calculated by dividing the number of bits used to indicate the locations of neighbor base stations first by the number of neighbor base stations and then by two.

In a preferred embodiment of the invention the neighbor base stations are divided into two or more groups, and the number of bits used to indicate the position of a given base station is determined on the basis of the group. For example, the locations of neighbor base stations best suited for positioning can be indicated with a larger number of bits and higher accuracy than those of other neighbor base stations. The number of bits used to indicate the neighbor base station data may thus be different for different neighbor base stations.

The content information 100 may also include other information than the information according to the example described above. Such information could be e.g.

information about whether the base stations are synchronized or not, information about whether the base station location data are encrypted or not, or e.g.

information about whether the encryption key used to encrypt the base station location data has been changed after the sending of the previous message. Encryption can be utilized to implement location services liable to charges, whereby a payment is required for the encryption key needed to decrypt encrypted data.

The message may include other information than the information according to the example described above. For example, the message may include certain fixed-length information elements the order of which in the message with respect to other information elements and the length of which are constant so that they need not be introduced in the content information portion 100 described above.

If a base station is sectored, each sector is mentioned according to the prior art in the neighbor base station list in the same manner as base stations proper. Indeed, an SMS-CB message or other corresponding message can advantageously be used to indicate which channels mentioned in the neighbor base station list correspond to the sectors of a given base station. Such a channel group can be given common position data since the respective transmitters are physically located at the same place. In addition, the message may advantageously include information about whether the sectors in question are mutually synchronized in time.

The message may also include variable data other than those described in the examples above. In other preferred embodiments of the invention the content information portion 100 includes one bit indicating whether a so-called multiframe offset value is given in conjunction with the RTD values. Furthermore, the message may also define the time slot scheme used by the neighbor cells, i.e. whether a particular neighbor cell uses a 156.24-bit time slot or a 156/157-type time slot arrangement. This can be indicated using a bit sequence in which bit value 0 indicates that the neighbor cell uses a 156.25-bit time slot and bit value 1 indicates that the neighbor cell in question uses a 156/157-type time slot arrangement. Moreover, the message may also include information associated with sectored channels of neighbor cells.

Let us next consider the contents of SMS-CB messages according to two slightly different example cases. In the first example there are 15 neighbor base stations so the locations of the neighbor base stations can be indicated quite accurately. In the second example, one message defines the locations of 22 neighbor base stations so only relatively few bits are left to indicate the base station locations, whereby the indication of the locations is not as accurate as in the first example.

In the first example, the structure of the payload portion of the SMS-CB message is as follows:

| information element | bits |
| --- | --- |
| content information | 14 |
| time slot scheme definition | 16 |
| neighbor base station bit sequence | 0 |
| sectored channels definition | 16 |
| sectored channels base station identifications | 18 |
| sectored base station sync information | 2 |
| multiframe offset values | 66 |
| RTD values | 154 |
| serving cell location data | 49 |
| neighbor base station location data | 321 |
| total | 656 |

In this example the message communicates the data for 15 base stations. In this example, other data leave 321 bits for the neighbor base station location data. In this example, the value range of the neighbor base station location is defined as 15 km in the content information portion. As the number of bits used to represent the neighbor base station location data is not evenly dividable between the base stations, the data of certain base stations are given with an accuracy one bit higher than the others. The location data of these certain neighbor base stations are represented by 15 bits, so the accuracy will be 0.46 meters per bit, approximately, and the location data of the other neighbor base stations are represented by 14 bits, resulting in an accuracy of 0.94 meters per bit, approximately. A total of 656 bits in the SMS-CB payload portion, or 82 octets, are used to represent the various information elements.

In the second example the structure of the payload portion of the SMS-CB message is as follows:

| information element | bits |
| --- | --- |
| content information | 14 |
| time slot scheme definition | 23 |
| neighbor base station bit sequence | 0 |
| sectored channels definition | 23 |
| sectored channels base station identifications | 45 |
| sectored base station sync information | 8 |
| multiframe offset values | 90 |
| RTD values | 210 |
| serving cell location data | 49 |
| neighbor base station location data | 194 |
| total | 656 |

In this example, the message communicates the data for 22 base stations. In this example, other data leave only 194 bits for the neighbor base station location data because the amount of information to be communicated increases as the number of base stations increases. In this case the number of bits used to indicate the locations of the neighbor base stations has been reduced considerably in order to facilitate the communication of all necessary information. In this example, the value range of the neighbor base station location is defined as 15 km in the content information portion. To utilize all bits, the location data of certain neighbor base stations are in this example indicated using 7 bits, thus achieving an accuracy of about 118 meters per bit, and the location data of other neighbor base stations are indicated using 6 bits, achieving an accuracy of about 238 meters per bit. In this case, too, a total of 656 bits, or 82 octets, in the SMS-CB payload portion are used to represent the various information elements.

Figure 2:
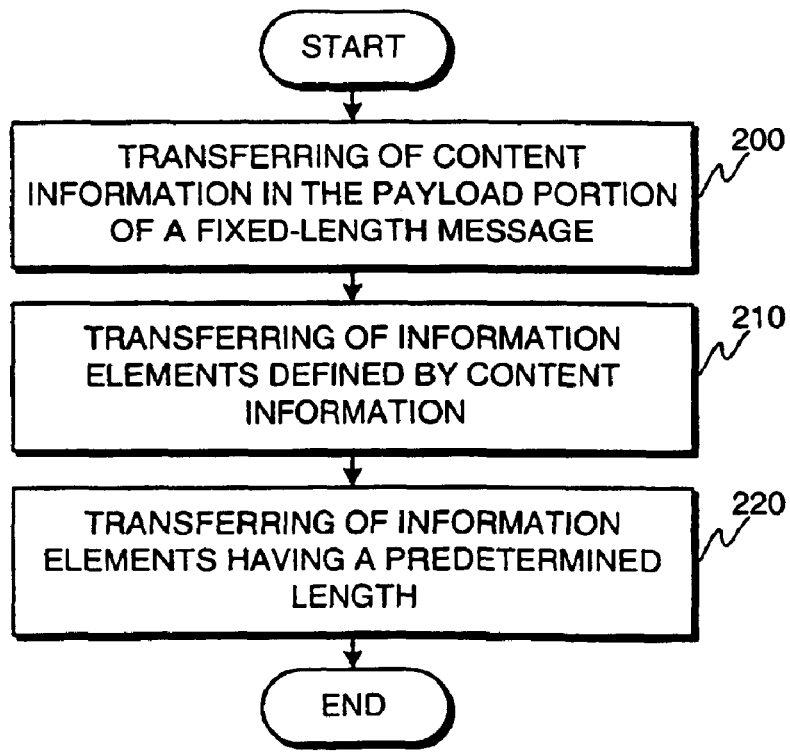

According to a further aspect of the invention, a method in a mobile communication system for transferring information in a fixed-length message from a base station to at least one mobile station is provided. FIG. 2 illustrates such a method according to an advantageous embodiment of the invention. According to the embodiment, content information is transferred 200 in the payload portion of the message for defining the contents of the payload portion of the message, and information elements defined by said content information are transferred 210 in the payload portion of the message according to said content information.

In a further advantageous embodiment of the invention, information elements of predetermined length are transferred 220 in the payload portion of the message in addition to the information elements defined in said content information.

Advantages of the invention are numerous. Location services of mobile communication systems may have varying accuracy requirements according to the application or location. Since the positioning data message is base station specific, the method according to the invention can be used to freely choose the accuracy of representation of base station location data for each base station area. Moreover, the method according to the invention can be used, if desired, to disclose the location data of only certain base stations, such as base stations particularly advantageous from the positioning standpoint, and to exclude the data of base stations located disadvantageously from the positioning standpoint, so that the mobile stations located in a particular area have at their disposal the best possible selection of base stations for positioning in that area. The exclusion of data of disadvantageously located base stations has the additional advantage that the data of optimal base stations can then be represented by a larger number of bits, i.e. with better accuracy, which improves the accuracy of positioning. The method according to the invention facilitates flexible adjustment of positioning parameters in a manner required by the characteristics of each particular position.

The invention was above described referring to its preferred embodiments, but it is obvious that the invention can be modified in many ways in accordance with the inventional idea defined by the claims attached hereto. For example, the invention can be utilized in many different mobile communication systems such as e.g. UMTS (Universal Mobile Telecommunication System) or other so-called third-generation mobile communication systems.

What is claimed is:

1. A method in a mobile communication system for transferring information in a fixed-length message from a base station to at least one mobile station, wherein:

content information is transferred in the payload portion of the message for defining the contents of the payload portion of the message, and variable-length information elements defined by said content information are transferred in this payload portion of the message according to said content information;

further comprising:

acquiring and selecting at least one value for transfer in said fixed length message, defining a size for an information elements for each of said values depending on the number of said values that are to be transferred in said fixed length message, defining a representation accuracy for each said values depending on the corresponding defined information element sizes, defining for each of said values an information element representing said values depending on the corresponding defined representation accuracy, transferring content information in the payload portion of the message for defining the contents of the payload portion of the message, and transferring said information elements defined by said content information in the payload portion of the message according to said content information.

2. A method according to claim 1, wherein said information elements comprise at least information elements containing position data.

3. A method according to claim 2, wherein said information elements define the location of at least one neighbor base station relative to the base station.

4. A method according to claim 1, wherein said content information defines a value range for data to be transferred corresponding to the binary value range of at least one information element.

5. A method according to claim 1, wherein said content information defines the magnitude of the step of the value of data to be transferred corresponding to the smallest binary value step of at least one information element.

6. A method according to claim 1, wherein information elements of predetermined length are transferred in the payload portion of the message in addition to the information elements defined in said content information.

7. A method according to claim 1, wherein said fixed-length message is an SMS-CB message.

8. A method according to claim 1, further comprising a step of formatting data into a message for transmission by a base station over a mobile communication network, the message comprising a payload portion, wherein the method further comprises the sub-steps of receiving information data and information type data and placing them in the payload portion of the message.

9. A method as claimed in claim 8, wherein sufficient base station location information for a receiver to subsequently determine its own location is provided in a single message.

10. A method as claim 1, wherein different scaling is applied to the information parts.

11. A method of scaling information data corresponding to base station location information for placement of a fixed length portion of a message, the method comprising:

identifying the part of the information data relating to each base station for which location information is to be carried by the fixed length portion of the message;

scaling the information data parts so that the information data fits the fixed length portion of the message;

wherein different scaling is applied to the information parts and the information part corresponding to a base station is larger than that of other base stations.

12. A method as claimed in claim 11, further comprising formatting data into a message for transmission by a base station over a mobile communications network, the formatting step comprising:
    receiving said scaled information data; and
    placing the scaled information data into the fixed length portion of the message.

13. A method as claimed in claim 12, wherein the fixed length portion of the message is part of a payload.

14. A method as claimed in claim 13, further comprising the steps of receiving information type data and placing it in the payload portion of the message.

15. A method as claimed in claim 14, wherein the information type data comprises at least one of:
    a definition of the base station which neighbor the transmitting base stations;
    accuracy indicator for data relating to the neighboring base stations;
    accuracy indicator for the relative time difference (RTD) values between the neighboring base stations and the transmitting base station; and
    a range indicator of the RTD value.

16. A method as claimed in claim 11, wherein the message is an SMSCB message.

17. A method of scaling information data corresponding to base station location information for placement of a fixed length portion of a message, the method comprising:
    identifying the part of the information data relating to each base station for which location information is to be carried by the fixed length portion of the message;
    scaling the information data parts so that the information data fits the fixed length portion of the message;
    formatting data into a message for transmission by a base station over a mobile communications network, the formatting step comprising:
    receiving said scaled information data; and
    placing the scaled information data into the fixed length portion of the message;
    wherein the fixed length portion of the message is part of a payload;
    further comprising the steps of receiving information type data and placing it in the payload portion of the message; and
    wherein the information type data comprises at least one of:
    a definition of the base station which neighbor the transmitting base stations;
    accuracy indicator for data relating to the neighboring base stations;
    accuracy indicator for the relative time difference (RTD) values between the neighboring base stations and the transmitting base station; and
    a range indicator of the RTD value.

18. A method as claimed in claim 17, wherein the same scaling is applied to the information data parts.

19. A method as claimed in claim 17, wherein the message is an SMSCB message.

20. A fixed length message for a mobile communication system for transferring information from a base station to at least one mobile station, wherein
    content information is transferred in the payload portion of the message for defining the contents of the payload portion of the message; and
    variable length information elements defined by said content information are transferred in the payload portion of the message according to said content information.

21. A message as claimed in claim 20, wherein the information comprises at least one of:
    a definition of the base stations which neighbor the transmitting base station;
    a first accuracy indicator for data relating to the neighboring base stations;
    a second accuracy indicator for the relative time difference (RTD) values between the neighboring base stations and the transferring base station; and
    a range indicator.

22. A mobile communication system for transferring information in a fixed-length message from a base station to at least one mobile station, wherein said system comprises:
    means for transferring content information in the payload portion of the message for defining the contents of the payload portion of the message, and
    variable-length information elements defined by said content information are transferred in this payload portion of the message according to said content information;
    said system further comprising:
    means for acquiring and selecting at least one value for transfer in said fixed length message,
    means for defining a size for an information elements for each of said values depending on the number of said values that are to be transferred in said fixed length message,
    means for defining a representation accuracy for each said values depending on the corresponding defined information element sizes,
    means for defining for each of said values an information element representing said values depending on the corresponding defined representation accuracy,
    means for transferring content information in the payload portion of the message for defining the contents of the payload portion of the message, and
    means for transferring said information elements defined by said content information in the payload portion of the message according to said content information.

23. A system for scaling information data corresponding to base station location information for placement of a fixed length portion of a message, the system comprising:
    means for identifying the part of the information data relating to each base station for which location information is to be carried by the fixed length portion of the message;
    means for scaling the information date parts so that the information data fits the fixed length portion of the message;
    wherein different scaling is applied to the information parts and the information part corresponding to a base station is larger than that of other base stations.

24. A system for scaling information data corresponding to base station location information for placement of a fixed length portion of a message, the system comprising:
    means for identifying the part of the information data relating to each base station for which location information is to be carried by the fixed length portion of the message;
    means for scaling the information data parts so that the information data fits the fixed length portion of the message;
    means for formatting data into a message or transmission by a base station over a mobile communications network, the formatting means comprising:

means for receiving said scaled information data; and means for placing the scaled information data into the fixed length portion of the message;

wherein the fixed length portion of the message is part of a payload;

said system further comprising:

means for receiving information type data and placing it in the payload portion of the message; and wherein the information type data comprises at least one of:

a definition of the base station which neighbor the transmitting base stations;

accuracy indicator for data relating to the neighboring base stations;

accuracy indicator for the relative time difference (RTD) values between the neighboring base stations and the transmitting base station; and a range indicator of the RTD value.

25. A mobile station for use in a mobile communication system for transferring information in a fixed-length message from a base station to the mobile station, wherein said system comprises:

means for transferring content information in the payload portion of the message for defining the contents of the payload portion of the message, and variable-length information elements defined by said content information are transferred in this payload portion of the message according to said content information;

said system further comprising:

means for acquiring and selecting at least one value for transfer in said fixed length message, means for defining a size for an information elements for each of said values depending on the number of said values that are to be transferred in said fixed length message, means for defining a representation accuracy for each said values depending on the corresponding defined information element sizes, means for defining for each of said values an information element representing said values depending on the corresponding defined representation accuracy, means for transferring content information in the payload portion of the message for defining the contents of the payload portion of the message, and means for transferring said information elements defined by said content information in the payload portion of the message according to said content information.

26. A mobile station for use in a system which scales information data corresponding to base station location information for placement of a fixed length portion of a message, the system comprising:

means for identifying the part of the information data relating to each base station for which location information is to be carried by the fixed length portion of the message;

means for scaling the information data parts so that the information data fits the fixed length portion of the message;

wherein different scaling is applied to the information parts and the information part corresponding to a base station is larger than that of other base stations.

27. A mobile station for use in a system which scales information data corresponding to a base station location information for placement of a fixed length portion of a message, the system comprising:

means for identifying the part of the information data relating to each base station for which location information is to be carried by the fixed length portion of the message;

means for scaling the information data parts so that the information data fits the fixed length portion of the message;

means for formatting data into a message for transmission by a base station over a mobile communications network, the formatting means comprising:

means for receiving said scaled information data; and means for placing the scaled information data into the fixed length portion of the message;

wherein the fixed length portion of the message is part of a payload;

said system further comprising:

means for receiving information type data and placing it in the payload portion of the message; and wherein the information type data comprises at least one of:

a definition of the base station which neighbor the transmitting base stations;

accuracy indicator for data relating to the neighboring base stations;

accuracy indicator for the relative time difference (RTD) values between the neighboring base stations and the transmitting base station; and a range indicator of the RTD value.

28. A base station for use in a mobile communication system for transferring information in a fixed-length message from the base station to at least one mobile station, wherein the system comprises:

means for transferring content information in the payload portion of the message for defining the contents of the payload portion of the message, and variable-length information elements defined by said content information are transferred in this payload portion of the message according to said content information;

said system further comprising:

means for acquiring and selecting at least one value for transfer in said fixed length message, means for defining a size for an information elements for each of said values depending on the number of said values that are to be transferred in said fixed length message, means for defining a representation accuracy for each said values depending on the corresponding defined information element sizes, means for defining for each of said values an information element representing said values depending on the corresponding defined representation accuracy, means for transferring content information in the payload portion of the message for defining the contents of the payload portion of the message, and means for transferring said information elements defined by said content information in the payload portion of the message according to said content information.

29. A base station for use in a system which scales information data corresponding to the base station location information for placement of a fixed length portion of a message, the system comprising:

means for identifying the part of the information data relating to each base station for which location information is to be carried by the fixed length portion of the message;

means for scaling the information data parts so that the information data fits the fixed length portion of the message;

wherein different scaling is applied to the information parts and the information part corresponding to a base station is larger than that of other base stations.

30. A base station for use in a system which scales information data corresponding to the base station location information for placement of a fixed length portion of a message, the system comprising:

means for identifying the part of the information data relating to each base station for which location information is to be carried by the fixed length portion of the message;

means for scaling the information data parts so that the information data fits the fixed length portion of the message;

means for formatting data into a message for transmission by the base station over a mobile communications network, the formatting means comprising:

means for receiving said scaled information data; and means for placing the scaled information data into the fixed length portion of the message;

wherein the fixed length portion of the message is part of a payload;

said system further comprising:

means for receiving information type data and placing it in the payload portion of the message; and wherein the information type data comprises at least one of:

a definition of the base station which neighbor the transmitting base stations;

accuracy indicator for data relating to the neighboring base stations;

accuracy indicator for the relative time difference (RTD) values between the neighboring base stations and the transmitting base station; and a range indicator of the RTD value.

31. A fixed length message for a mobile communication system for transferring information from a base station to at least one mobile station, wherein content information is transferred in the payload portion, of the message for defining the contents of the payload portion of the message; and variable length information elements defined by said content information are transferred in the payload portion of the message according to said content information;

wherein the information comprises at least one of:

a definition of the base stations which neighbor the transmitting base station;

a first accuracy indicator for data relating to the neighboring base stations;

a second accuracy indicator for the relative time difference (RTD) values between the neighboring base stations and the transferring base station; and a range indicator.

32. A fixed length message for a mobile communication system for transferring information from a base station to at least one mobile station, wherein content information is transferred in the payload portion of the message for defining the contents of the payload portion of the message; and variable length information elements defined by said content information are transferred in the payload portion of the message according to said content information;

wherein the information comprises at least one of:

information about whether the base stations are synchronized or not, information about whether the base station location data are encrypted or not, information about whether an encryption key used to encrypt the base station location data has been changed after the sending of the previous message, and fixed-length information elements the order of which in the message with respect to other information elements and the length of which are constant.

* * * * *